United States Patent
Birkenbach

[19]

[11] Patent Number: 5,127,713
[45] Date of Patent: Jul. 7, 1992

[54] ANTI-LOCK BRAKE SYSTEM FOR AUTOMOTIVE VEHICLES

[75] Inventor: Alfred Birkenbach, Hattersheim, Fed. Rep. of Germany

[73] Assignee: Alfred Teves GmbH, Frankfurt am Main, Fed. Rep. of Germany

[21] Appl. No.: 281,299

[22] Filed: Dec. 7, 1988

[30] Foreign Application Priority Data

Dec. 12, 1987 [DE] Fed. Rep. of Germany ......... 374173

[51] Int. Cl.⁵ .............................................. B60T 8/32
[52] U.S. Cl. ........................ 303/113 R; 303/113 AP; 303/116 R; 303/119 SV; 303/84.1
[58] Field of Search ................ 303/9.63, 92, 113, 114, 303/115, 119, 116 R, 113 R, 119 SV, 116 SP, 114 R, 113 SS, 84.1, 84.2, 87, 113 AP; 73/121

[56] References Cited

U.S. PATENT DOCUMENTS

| | | | |
|---|---|---|---|
| 3,881,781 | 5/1975 | Skoyles | 303/92 |
| 4,637,662 | 1/1987 | Brown | 303/92 |
| 4,657,312 | 4/1987 | Burgdorf et al. | 303/92 |
| 4,783,125 | 11/1988 | Belart et al. | 303/92 |

FOREIGN PATENT DOCUMENTS

| | | | |
|---|---|---|---|
| 0210422 | 2/1987 | European Pat. Off. | 303/115 |
| 0265761 | 5/1988 | European Pat. Off. | |
| 3317629 | 11/1984 | Fed. Rep. of Germany | |
| 3428869 | 2/1986 | Fed. Rep. of Germany | |
| 3440541 | 5/1986 | Fed. Rep. of Germany | 303/92 |

Primary Examiner—Matthew C. Graham
Attorney, Agent, or Firm—Robert P. Seitter; J. Gordon Lewis

[57] ABSTRACT

An anti-lock brake system for automotive vehicles comprising a master cylinder (1), a device for modulating the pressure supplied to the wheel brakes, at least one control device (2), at least one monitoring device and a device for pressure reduction provided in the rear-axle brake circuit (7). In order to maximally utilize the share the rear-wheel brakes have in the total brake force, without causing an unstable vehicle condition thereby, braking pressure reduction is effected only upon failure of the anti-lock device.

2 Claims, 2 Drawing Sheets

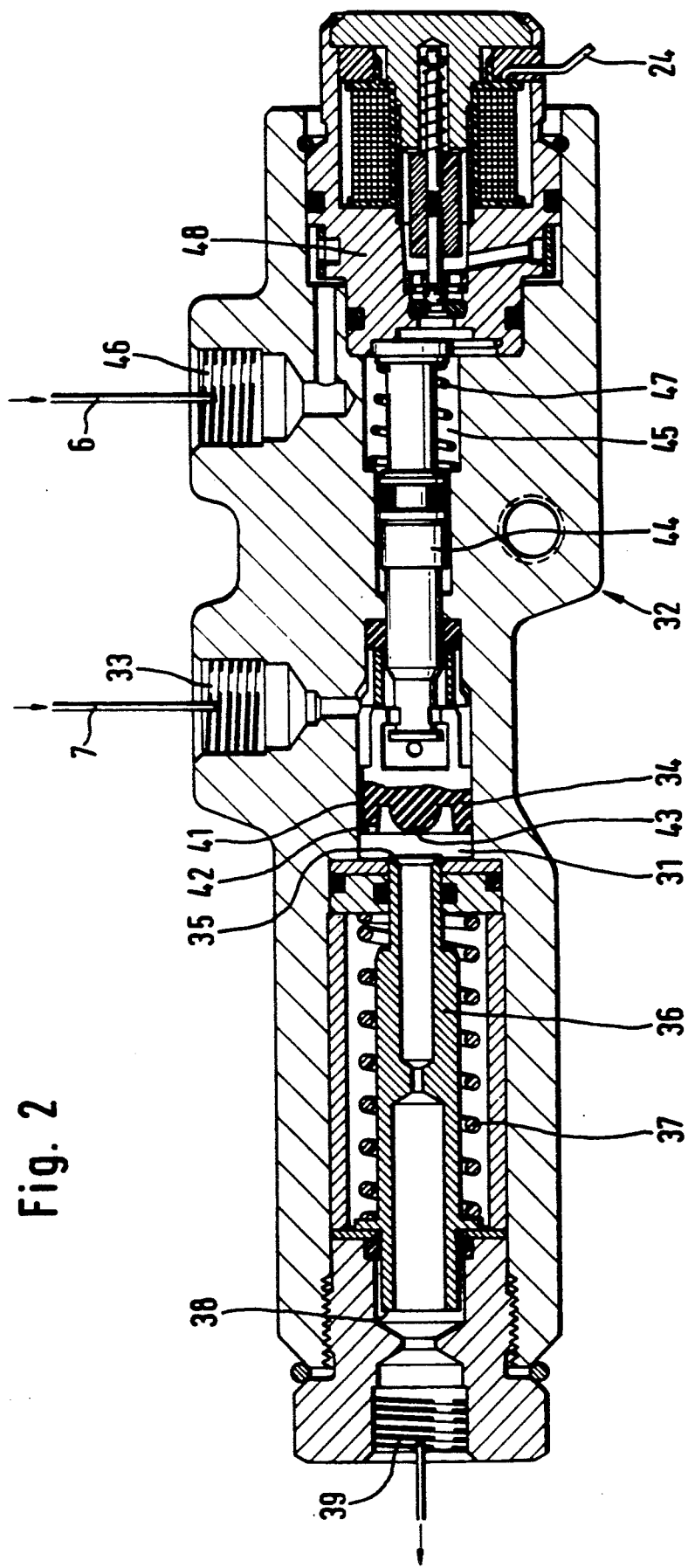

ANTI-LOCK BRAKE SYSTEM FOR AUTOMOTIVE VEHICLES

BACKGROUND OF THE INVENTION

The present invention relates to an anti-lock brake system for automotive vehicles comprising a master cylinder, a device for modulating the pressure supplied to the brakes, an anti-lock control device with at least one monitoring device, and means for pressure reduction in the rear-axle brake circuit.

A brake system of this type is known from German published patent application 33 29 706. In this known system, upon commencement of an anti-lock function, a bypass line leading to the rear axle is simultaneously opened in order to utilize the reverse in brake force until the limit of locking of the rear wheels is reached. This brake system has the disadvantage that, when the anti-lock function commences, the rear-axle brakes will be abruptly applied with the full braking pressure corresponding to the wheel-lock pressure of the front axle instead of the controlled pressure, which results in unstable driving conditions, at least in the short term.

SUMMARY OF THE INVENTION

Therefore, it is an object of the present invention to provide a brake system for automotive vehicles which optimally utilizes the reserve of brake force of the rear-wheel brakes and, in addition, attains stable driving conditions.

This object is achieved in an anti-lock brake system according to the present invention in that the means for the pressure reduction carries out the braking pressure reduction only upon failure or malfunction of the anti-lock function. The basic dimensioning of the brake force distribution between front-wheel brakes and rear-wheel brakes in the event of pressure reduction being ineffective, provides for relatively heavily loaded rear-axle brakes. This basic dimensioning is selected such that, in the event of ineffective brake force reduction, the rear-axle brakes reach the limit of wheel lock before the front-axle brakes.

A particularly advantagious embodiment of this invention provides that the means for pressure reduction are formed by at least one braking pressure reducer and around which a bypass line is arranged which can be opened or closed by a solenoid valve. Preferably, if the solenoid valve is designed as a solenoid valve which is closed in its de-energized state and which is energized when the anti-lock device is intact. It is thereby ensured that, even upon failure of the anti-lock device or even in the event of a defect in the electrical connection between solenoid valve and signal generator, the bypass is closed and the hydraulic communication between the master cylinder and the rear-wheel brakes is possible solely by way of the pressure reducer. This ensures that locking of the rear-wheel brakes is always prevented when an error occurs.

BRIEF DESCRIPTION OF THE DRAWING

These and other advantages of this invention can be gathered from the following detailed description with reference to the accompanying drawings.

In the drawing wherein:

FIG. 2 is a cross-sectional view of an alternative braking pressure reducer with blocking piston and solenoid valve for use in the system illustrated in FIG. 1.

DETAILED DESCRIPTION OF A PREFERRED EMBODIMENT

Figure 1:
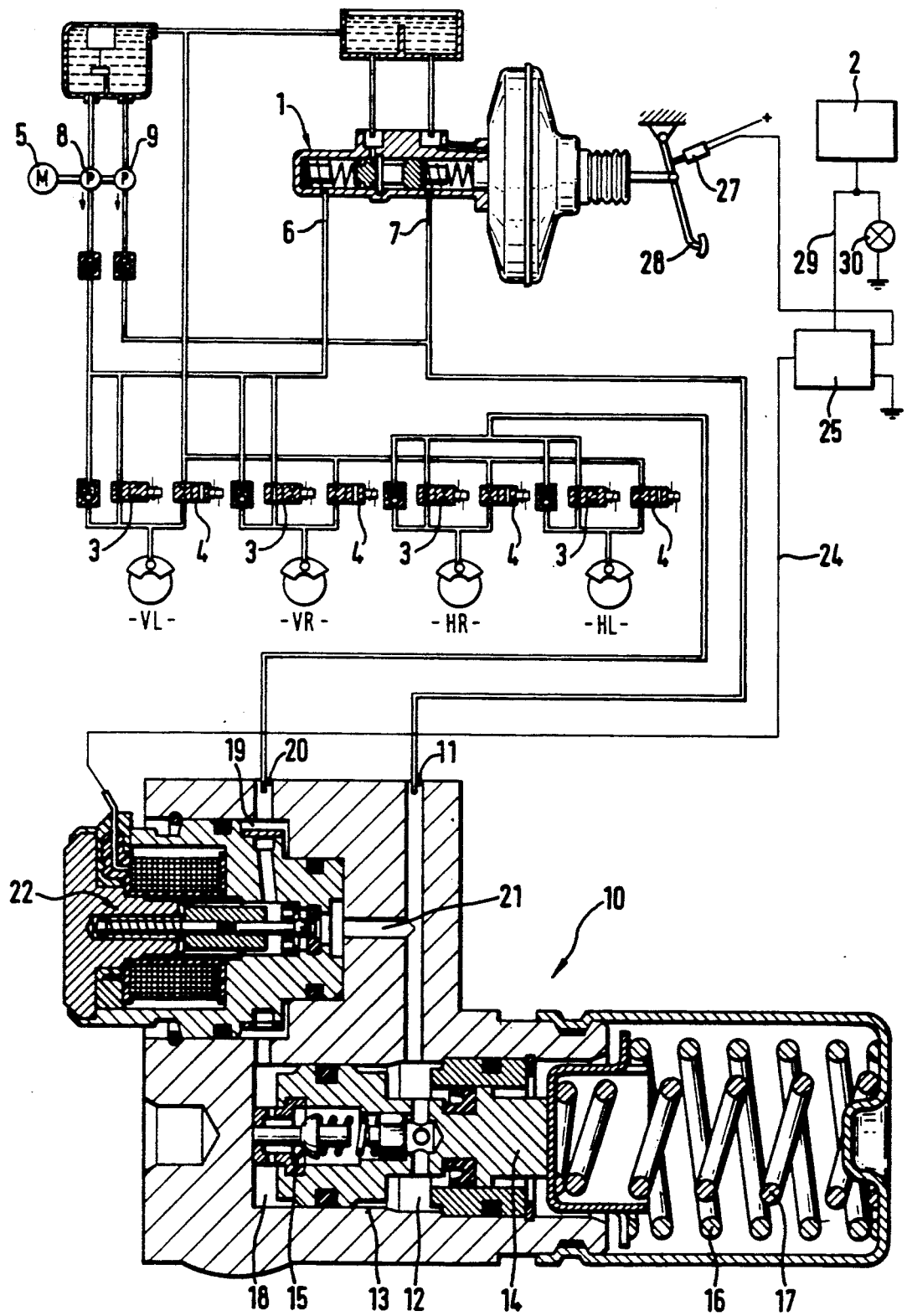
FIG. 1 is an inventive anti-lock brake system in accordance with the principles of the present invention.

FIG. 1 schematically illustrates the essential hydraulical portion of an anti-lock brake system. For clarity, the electrical part of the brake system is depicted only insofar as it is necessary for an understanding of this embodiment of the present invention. That is to say, the sensors for determining the rotational speed of the wheels, the connection of the sensors to the anti-lock control device 2 in which the monitoring device is integrated, and the connection from the solenoid valves 3, 4 for the pressure modulation to the motor 5 and to the anti-lock control device 2 are not shown. Likewise, the various switches and sensors for monitoring the system functions are not shown.

The brake system comprises a tandem master cylinder 1 from which a front-axle brake circuit 6 and a rear-axle brake circuit 7 lead to the associated wheel brakes by way of solenoid valves 3 serving as an inlet. For the purpose of pressure build-up during an anti-lock control action, during which the monitor 5 is driving the two pumps 8 and 9, the wheel brakes are each connectible by way of a solenoid valve 4 serving as an outlet with a return line leading to the reservoir.

A switchable braking pressure control device 10 in the rear-axle brake circuit 7 is provided, whose inlet 11 is connected with the inlet chamber 12 of a braking pressure as is known per se. This braking pressure reducer substantially comprises the regulating piston 14 which is axially slidably and sealedly guided in the bore 13 and the regulating valve 15 contained in the latter piston, the regulating piston 14 being biassed by the control springs 16, 17 in the opening direction of the spring-loaded regulating valve 15. From the outlet chamber 18 of the braking pressure reducer, a channel extends by way of the annular chamber 19 to the outlet 20 of the braking pressure control device 10 and from there by way of the solenoid valves 3 to the rear-wheel brakes.

In parallel to the bore 13, a bypass line 21 branches off from the connection of the inlet 11 and the inlet chamber 12, which line can be opened or closed by a solenoid valve 22. This bypass line 21 is thus connectible by way of channels disposed in the solenoid valve 22 with the annular chamber 19 and, consequently, likewise by way of the outlet 20 with the wheel brakes. The solenoid valve 22 is designed as a solenoid valve which is closed in its de-energized state and is actuated by the relay 25 to which it connects by way of the line 24. This relay 25 opens the solenoid valve 22 when the contact of the brake light switch 27 is closed after depression of the brake pedal 28 and no control voltage is applied to the relay 25 by way of the line 29 which connects the relay 25 to the monitoring device provided in the anti-lock control device. If the monitoring device detects a malfunction, a control voltage will be produced which switches on the alarm lamp 30 and, isolates the line 24 from the voltage source.

The basic dimensioning of brake force distribution is chosen such that the major load is heavily on or weighted toward the rear-axle brakes, which effectively relieves the front-wheel brakes from load in approximately 90% of all braking actions occurring in normal operation. This basic dimensioning of brake force distribution would result, that in the event of heavy braking, the rear wheels would lock before the front wheels do. This would result in unstable driving conditions as a consequence, if there were no anti-lock control and no pressure reduction means. However, because of the anti-lock system in accordance with the present invention, more particularly by virtue of the solenoid valves 3, 4, the pressure acting on the rear-wheel brakes is reduced by regulation to such degree that there is no longer a risk of wheel lock. Due to the basic dimensioning of brake force distribution, the pressure build-up during a "normal" anti-lock control action starts on the rear-axle brakes. In order to prevent locking of the rear wheels occuring upon failure of the anti-lock system, the present invention provides that the bypass line 21 is closed upon failure of anti-lock control and that the connection from the tandem master cylinder 1 to the rear-wheel brakes is provided by way of the braking pressure reducer.

FIG. 2 shows a braking pressure control device 32 which, in lieu of the braking pressure control device 10, can be mounted into a brake system according to FIG. 1. In this pressure control device, the rear-axle brake circuit 7 extends through the inlet 33 into an inlet chamber 31 in which also the valve closure member 34 is axially slidably provided in the main bore. This valve closure member 34 cooperates with a valve seat which is formed by the smaller end surface 35 of the regulating piston 36. The regulating piston 36 is provided as a differential piston with a through-bore and is biassed by the control spring 37 in the opening direction, that is, in the direction of the larger end surface 38. When a predetermined change-over pressure is attained in the outlet 39 which is in communication with the rear-wheel brakes, the regulating piston 36 will displace due to the differential large pressurized end surfaces 35, 38 in opposition to the force of the control spring 37 towards the valve closure member 34. This valve closure member 34 contains axially and radially extending channels 41, 42 adapted to be penetrated by fluid and includes a spherical sealing portion 43. The valve closure member 34 is anchored with the blocking piston 44 on the side which is axially opposite to the sealing portion 43.

The sealedly displaceable blocking piston 44 projects with its end surface opposite to the valve closure member 34 into the pressure chamber 45, the end surface that is applicable by the pressure in the pressure chamber 45 being somewhat larger than the effective pressure-applied surface of the blocking piston 44 in the inlet chamber 31. A compression spring 47 preloads the blocking piston 44 in the direction of the pressure chamber 45. The blocking piston thereby will move into abutment on the housing of the solenoid valve 48. This solenoid valve 48 governs the connection between the pressure chamber 45 and the port 46 communicating with the front-axle brake circuit 6. When the connection between port 46 and pressure chamber 45 is opened, the blocking piston 44 will be displaced in the direction of inlet chamber 31 in opposition to the force of compression spring 47, with the result that the valve closure member 34 is caused to adopt its working position.

The electric switching of the solenoid valve 48 is effected such that the connection between port 46 and pressure chamber 45 is closed when the anti-lock system is functioning, while it opens in the event of failure of the anti-lock system. For safety reasons, the solenoid valve 48 is provided as a solenoid valve which is open in its de-energized state. The use of a braking pressure control device with blocking function has the additional advantage that, upon failure of the front-axle brake circuit, for example due to leakage, braking pressure reduction function is not applied and thus the rear-wheel brakes can be applied with the maximum braking pressure.

What is claimed is:

1. The anti-lock brake system for automotive vehicles comprising, in combination: a master cylinder, a device for modulating the pressure supplied to the wheel brakes, at least one anti-lock control device for providing an anti-lock control function to selected wheel brakes, at least one monitoring device coupled to the anti-lock device for detecting a malfunction of the anti-lock function and means coupled between said master cylinder and the rear-axle brake circuit for pressure reduction provided in said rear-axle brake circuit, said means for pressure reduction being responsive to said monitoring device wherein braking pressure reduction is effected solely upon the occurrence of a malfunction of the anti-lock function, wherein the means for pressure reduction comprises at least one braking pressure reducer providing a blocking function, with the pressurization of a blocking piston of said pressure reducer being controllable by a solenoid valve.

2. The anti-lock brake system as claimed in claim 1, wherein the braking pressure reducer has a predetermined change-over pressure.

* * * * *